United States Patent [19]
Matsuzono et al.

[11] Patent Number: 6,101,067
[45] Date of Patent: Aug. 8, 2000

[54] THIN FILM MAGNETIC HEAD WITH A PARTICULARLY SHAPED MAGNETIC POLE PIECE AND SPACED RELATIVE TO AN MR ELEMENT

[75] Inventors: Atsushi Matsuzono; Hiroshi Takino, both of Kanagawa, Japan

[73] Assignee: Sony Corporation, Tokyo, Japan

[21] Appl. No.: 08/760,725

[22] Filed: Dec. 5, 1996

Related U.S. Application Data

[63] Continuation of application No. 08/490,866, Jun. 15, 1995, abandoned, which is a continuation of application No. 08/168,137, Dec. 17, 1993, abandoned.

[30] Foreign Application Priority Data

Dec. 17, 1992 [JP] Japan ................................ P04-337214

[51] Int. Cl.[7] ........................................................ G11B 5/39
[52] U.S. Cl. ............................................................ 360/113
[58] Field of Search ............................................. 360/113

[56] References Cited

U.S. PATENT DOCUMENTS

| | | | |
|---|---|---|---|
| 4,617,600 | 10/1986 | Somers | 360/113 |
| 5,218,497 | 6/1993 | Tanabe et al. | 360/113 |
| 5,241,439 | 8/1993 | Michalek et al. | 360/113 |
| 5,270,895 | 12/1993 | Rugrok et al. | 360/113 |
| 5,311,385 | 5/1994 | Schwarz et al. | 360/113 |
| 5,315,469 | 5/1994 | McNeil | 360/113 |

FOREIGN PATENT DOCUMENTS

| | | |
|---|---|---|
| 2-128312 | 5/1988 | Japan . |
| 3-171410 | 7/1989 | Japan . |

OTHER PUBLICATIONS

Wakamatsu, "Effects of Spacing on Recording Characteristics of a Perpendicular Double–Layer Disk", Journal of The Magnetics Society of Japan, vol. 15 (1991), pp. 875–880.
Suyama et al, "Thin Film Mr Head for High Density Rigid Disk Drive", IEEE Transactions on Magnetics, line 24, No. 6, pp. 2612–2614, Nov./1988.
Imakoshi, "Yoke Type MR head", MR84–44, pp. 19–24.

*Primary Examiner*—Brian E. Miller
*Attorney, Agent, or Firm*—Hill & Simpson

[57] ABSTRACT

A thin film magnetic head has a main magnetic pole piece, a magnetoresistance effect element, a bias layer giving a bias magnetic field to the magnetoresistance effect element, an auxiliary magnetic pole piece and an insulating layer leaving a space between the main magnetic pole piece and the auxiliary magnetic pole piece, the main magnetic pole piece is almost disposed in parallel with the magnetoresistance effect element, a distance between the main magnetic pole piece and the magnetoresistance effect element is selected from 1 nm to 1 $\mu$m.

16 Claims, 5 Drawing Sheets

THIN FILM MAGNETIC HEAD WITH A PARTICULARLY SHAPED MAGNETIC POLE PIECE AND SPACED RELATIVE TO AN MR ELEMENT

This is a continuation, of application Ser. No. 08/490,866 now abandoned, filed Jun. 15, 1995 which is a continuation of Ser. No. 08/168,137 filed Dec. 17, 1993 now abandoned.

FIELD OF THE INVENTION

This invention relates to a thin film magnetic head and more particularly relates to a magnetoresistance effect type thin film magnetic head.

BACKGROUND OF THE INVENTION

It is known that a perpendicular magnetic recording system is theoretically possible to record a higher density than a longitudinal magnetic recording system. The perpendicular magnetic recording system has been researched for many years. It was confirmed that the perpendicular magnetic recording system could record 600 kFCI (Flux Change per Inch) or more.

The perpendicular magnetic recording system has a problem on reproduction. A magnetic leakage flux output from a magnetic recording medium is not enough to reproduce. The problem is bigger in a hard disk apparatus which a flying magnetic head is utilized as a magnetic reproducing head, because the magnetic head reproduces a magnetic signal while not contacting a magnetic recording medium. A high reproducing sensitivity is necessary to put the perpendicular magnetic recording system to practical use.

For this purpose, the following perpendicular magnetic recording system is researched. In this system, the magnetic recording medium is utilized, which has a high permeability layer between a magnetic recording layer and a substrate. A single pole piece magnetic head is also utilized, which an auxiliary magnetic pole piece is provided in parallel with a main magnetic pole piece. The high permeability layer of the recording medium and the auxiliary magnetic pole piece of the single pole piece magnetic head form a closed magnetic circuit. For example, a paper such as "Journal of the Magnetic Society of Japan Vol. 15 Supplement, No. S2(1991), pp875–880" was published. A sufficient reproduction level is not obtained even in this paper.

Figure 6:
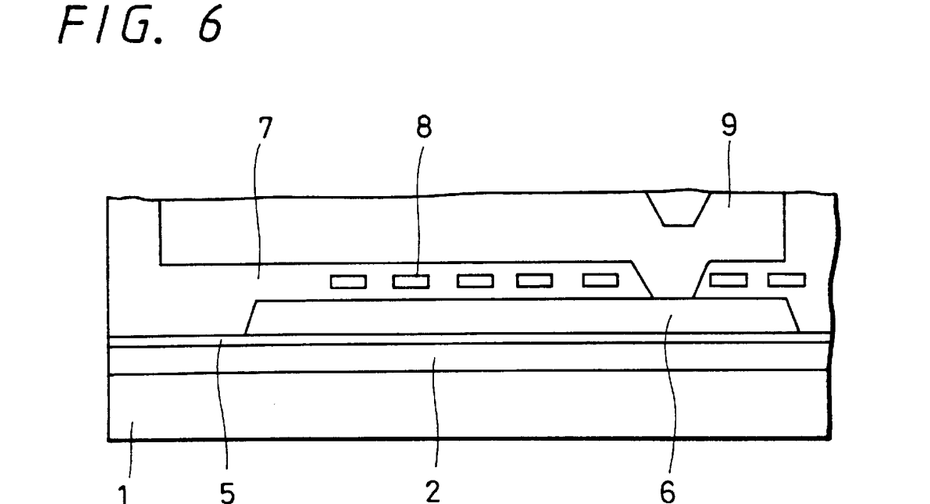
FIG. 6 is an enlarged sectional view of an example of the conventional thin film magnetic head.

The enlarged sectional view of this magnetic head is FIG. 6. A main magnetic pole piece 5 is disposed through an underlayer 2 such as $Al_2O_3$ on a non-magnetic substrate 1. Part of the main magnetic pole piece 5 is thick to increase a magnetic permeance (6). A coil conductor 8 is formed in a certain pattern through an insulating layer 7 on the main magnetic pole piece 5. An auxiliary magnetic pole piece 9 is disposed through the insulating layer 7 above the main magnetic pole piece 5. Part of the auxiliary magnetic pole piece 9 is connected to the main magnetic pole piece 5 to construct the closed magnetic circuit. A head surface 10 opposite to a magnetic recording medium is polished so as to expose the main magnetic pole piece to the head surface 10.

A magnetoresistance effect element (MR element) may be utilized to increase a reproduction sensitivity in a reproducing head. There are two types of magnetoresistance effect heads, a shield type head and a yoke type head. They are known in a longitudinal magnetic recording system. "IEEE TRANSACTIONS ON MAGNETICS, vol.24, No.6, Nov. (1988), pp2612–2614" discloses the shield type head. "OYOJIKIGAKKAI JIKIKIROKUKENKYUKAI SHIRYOU MR84–44, pp19–24" discloses the yoke type head. Japanese Laid Open Patent HEI 2-128312 and Japanese Laid Open Patent HEI 3-171410 disclose examples applying these heads to the perpendicular magnetic recording system.

These examples may be difficult to obtain enough magnetoresistance sensitivity because of the disposition of the MR element. They may also lose a recording efficiency. Further, these examples are not able to obtain the peculiar effect to the perpendicular magnetic recording which increases the recording efficiency by a closed magnetic circuit constructed between a high permeability layer of a magnetic recording medium and a magnetic head.

Figure 7:
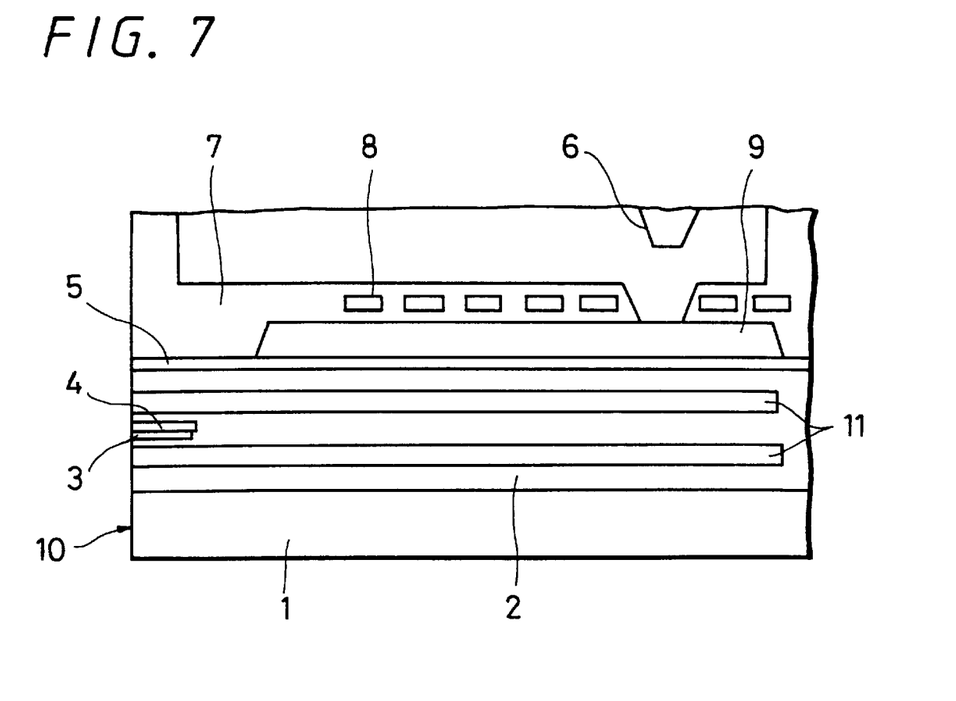
FIG. 7 is an enlarged sectional view of another example of the conventional thin film magnetic head.

The example disposing the MR element in the shield type head is shown in FIG. 7. A pair of shields being magnetic layers are disposed through an underlayer 2 such as $Al_2O_3$ on a substrate 1. A MR element 3 and a bias layer 4 being a conductive layer are disposed through an insulating layer between the shields 11. A main magnetic pole piece 5, a thick part of the main magnetic pole piece 6, a coil conductor 8, an auxiliary magnetic pole piece 9 for a recording head are disposed through the insulating layer as shown in FIG. 7. The MR element 3 and the main magnetic pole piece 5 of the recording head is exposed to the head surface 10 opposite to a magnetic recording medium.

In this example, because the MR element 3 is provided near the head surface 10, the high sensitivity is obtained. But because the MR element 3 is exposed to the head surface 10, the characteristics may be changed because of a contamination. It makes the reliability decline.

Further, this shield type head has the following problem. Because there is no auxiliary magnetic pole piece for the reproducing head, the closed magnetic circuit is not formed between the high permeability layer of the magnetic recording medium and the reproducing head. Because it is necessary to laminate the recording head and the reproducing head respectively, the construction becomes complicated. It is also a problem that the starting point of reproducing on the reproducing head is different from the starting point of recording on the recording head. When the head is moved by a rotation arm, the position reproduced by the reproducing head slips off the position recorded by the recording head in the direction of the track width.

Figure 8:
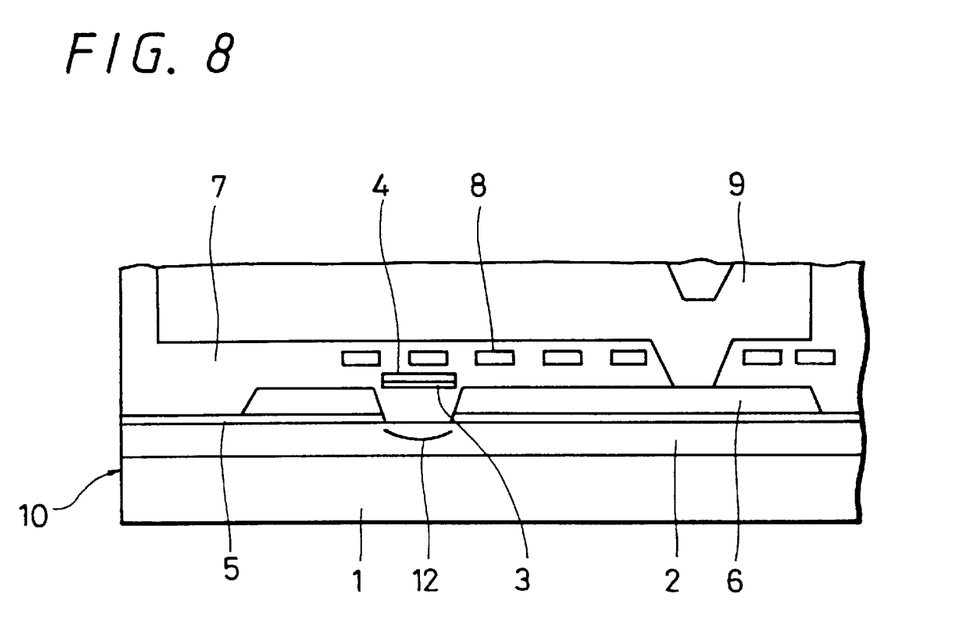
FIG. 8 is an enlarged sectional view of another example of the conventional thin film magnetic head.

The enlarged sectional view which a MR element is provided in the yoke type head is shown in FIG. 8. Part of the main magnetic pole piece 5 and the thick portion 6 of the main magnetic pole piece are cut off and a MR gap is formed at the cut off portion. The MR element 3 and the bias layer 4 are provided at the MR gap. This example has the following advantage and problems. Because the MR element is provided not to be exposed to the head surface, the reliability becomes high. But the sensitivity becomes low. The MR gap 12 is formed in the closed magnetic circuit. The MR element 3 having a high reluctance is provided in series with the closed magnetic circuit. So the closed magnetic circuit does not work enough and the signal magnetic flux is not led to the main magnetic pole piece efficiently.

SUMMARY OF THE INVENTION

One object of this invention is to provide a thin film magnetic head having a high recording efficiency and a high reproducing sensitivity.

According to a first embodiment of this invention, a thin film magnetic head includes a main magnetic pole piece, a magnetoresistance effect element, an auxiliary magnetic pole piece. The thin film magnetic head also includes a bias layer giving a bias magnetic field to the magnetoresistance effect element and an insulating layer leaving a space between the main magnetic pole piece and the auxiliary magnetic pole piece. The main magnetic pole piece is almost disposed in parallel with the magnetoresistance effect element. A distance between the main magnetic pole piece and the magnetoresistance effect element is selected from 1 nm to 1 μm.

According to a second embodiment of this invention, a thin film magnetic head includes a recording head and a reproducing head. The recording head includes a recording main magnetic pole piece, a recording auxiliary magnetic pole piece, a coil, an insulating layer leaving a space between the recording main magnetic pole piece and the coil, and a magnetic gap formed between the recording main magnetic pole piece and the recording auxiliary magnetic pole piece. The magnetic gap, the recording main magnetic pole piece and the recording auxiliary magnetic pole piece forms a closed magnetic circuit. The reproducing head includes a reproducing main magnetic pole piece, a magnetoresistance effect element spaced through an insulating layer from the reproducing main magnetic pole piece, a reproducing auxiliary magnetic pole piece, a bias layer giving a bias magnetic field to the magnetoresistance effect element. The reproducing reproducing main magnetic pole piece is almost disposed in parallel with the magnetoresistance effect element. A distance between the reproducing reproducing main magnetic pole piece and the magnetoresistance effect element is selected from 1 nm to 1 μm.

DETAILED DESCRIPTION OF THE INVENTION

EXAMPLE 1

Figure 1:
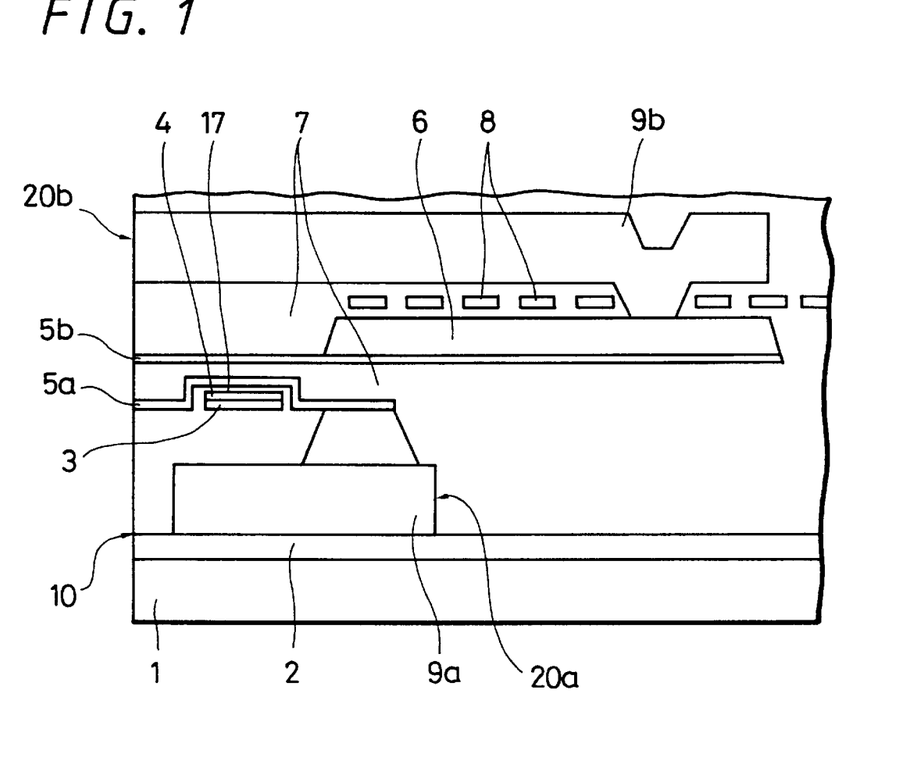
FIG. 1 is an enlarged sectional view of the first example of this invention.

FIG. 1 is the sectional view showing the thin film magnetic head of the first embodiment.

A substrate 1 is composed of a nonmagnetic material such as $Al_2O_3$—$TiO_3$. An underlayer 2 composed of $Al_2O_3$ is formed on the substrate 1 to increase the smoothness. An auxiliary magnetic pole piece 9*a*composed of a soft magnetic metal such as amorphous of cobalt or parmalloy is formed in a certain pattern by the thin film forming technique such as a sputtering, a vapor deposition or an electroplating. A MR element 3 is composed of Ni—Fe alloy or Ni—Fe—Co alloy. The MR element 3 having a thickness of 10 nm to 100 nm is formed above the auxiliary magnetic pole piece by a vapor deposition or a sputtering in a magnetic field while being given a magnetic anisotropy in the direction of the track width. A bias layer 4 is laminated on the MR element 3 and formed in a certain pattern with the MR element 3 by an ion etching to construct a MR element portion.

The MR element 3 is disposed so that the direction of the thickness of the MR element is in parallel with the direction of the thickness of the reproducing main magnetic pole piece 5*a* at least on part of the MR element 3. It makes the ratio of the magnetic flux flown to the MR element 3 large on reproducing. The direction of the bias magnetic field output from the bias layer 4 is perpendicular to the direction of the magnetic anisotropy of the MR element 3 on the plane of the MR element 3. The direction of the spontaneous magnetization in the MR element 3 is changed from the direction of the magnetic anisotropy to the direction having the angle of 45 degree by the bias magnetic field. It makes the change of the resistivity of the MR element 3 be almost linear. The first part of 5*c* the reproducing main magnetic pole piece 5*a* is almost in the same plane as the MR element 3. The second part 5*d* of the reproducing main magnetic pole piece 5*a* is almost perpendicular to the MR element 3, but it does not cross the MR element. The third part 5*e* of the reproducing main magnetic pole piece 5*a* is almost in parallel with the MR element 3.

The reproducing main magnetic pole piece 5*a* having legs 5*c*, 5*d*, 5*e*, 5*f* and 5*g* is formed through the insulating layer 17 above the MR element portion. It is composed of a soft magnetic material having a high permeability and a high saturation magnetic flux density such as an amorphous alloy of cobalt. An end 5*g* of the reproducing main magnetic pole piece 5*a* is connected to the reproducing auxiliary magnetic pole piece 9*a*.

An insulating layer 7 is overetched when the MR portion is etched. The insulating layer 17 having the thickness corresponding to the overetched thickness is deposited. A contact portion of the reproducing auxiliary magnetic pole piece 9*a* is selectively etched. The reproducing main magnetic pole piece piece 5*a* is contacted to the reproducing auxiliary magnetic pole piece 9*a* at the contact portion.

Figure 9:
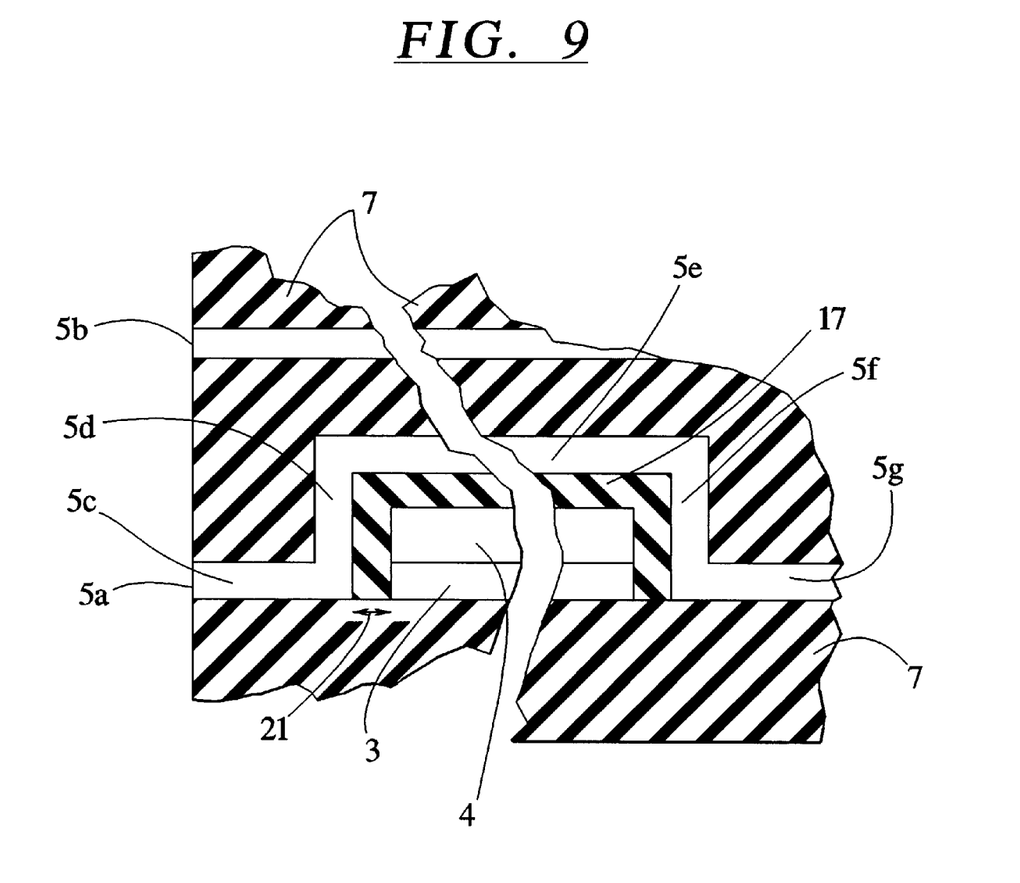
FIG. 9 is an enlarged fragment of FIG. 1.

The thickness of the insulating layer 17 corresponds to the distance 21 between the second part 5*d* of the main magnetic pole 5*a* and the MR element 3, as best shown in FIG. 9. The thickness of the insulating layer 17 is not smaller than 1 nm to cut the exchange couple between the main magnetic pole 5*a* and the MR element 3. The thickness of the insulating layer 17 is not larger than 1 μm not to weaken the magnetostatics worked on the MR element 3. In this example, it is 300 nm because the electric insulation and the strength of magnetostatics are considered.

Because the reproducing main magnetic pole piece 5*a* has a bend at the boundary between the MR element 3 and the reproducing main magnetic pole piece 5, a magnetic pole is produced at the bend. Therefore the magnetic flux is leaked out from the reproducing main magnetic pole piece 5*a* easily. The amount of the magnetic flux flow to the MR element 3 increases thereby. It makes the MR element 3 reproduce the signals efficiently. The thickness of the reproducing main magnetic pole piece 5*a*is necessary to be not larger than one half of the minimum wave length because of reproducing resolution. The thickness of the reproducing main magnetic pole piece 5*a* is selected from 100 nm to 500 nm. The reproducing sensitivity drops when the thickness of the reproducing main magnetic pole piece 5*a* is smaller than 100 nm.

The recording main magnetic pole piece 5b is composed of a soft magnetic material having a high permeability and a high saturation magnetic flux density such as an amorphous alloy. The recording main magnetic pole piece 5b is formed on the reproducing main magnetic pole piece 5a by a sputtering. The thick portion 6 of the recording main magnetic pole piece 5b is formed on part of the recording main magnetic pole piece 5b.

Because the thickness of the recording main magnetic pole piece 5b is thin, the magnetic resistance is large. This thick portion 6 of the recording main magnetic pole piece 5b is formed to decrease the magnetic resistance of the whole magnetic circuit. Because the magnetic flux density of this thick portion 6 is smaller than that of the recording main magnetic pole piece 5b, permalloy having comparatively a low saturation magnetic flux density is utilized for the thick portion 6 besides an amorphous alloy of cobalt. The thick portion 6 is formed by a sputtering, a vapor deposition and an electro-plate. The shorter the distance from the end of the thick portion 6 to the head surface 10 is in the range which there is no problem regarding the disposition of the MR element 3, the more efficient. The distance is selected from 3 $\mu$m to 10 $\mu$m.

An recording auxiliary magnetic pole piece 9b is provided through the insulating layer 7 and the coil conductor 8 in parallel with the thick portion 6. Part of the auxiliary magnetic pole piece 9b is connected to the thick portion 6 as to work as part of the closed magnetic circuit. The material of this recording auxiliary magnetic pole piece 9b is selected from the same material as the thick portion 6. The method for preparing the recording auxiliary magnetic pole piece 9b is as follows. A certain opening is formed in the insulating layer 7 by applying a photolithography. After a soft magnetic material is deposited on the insulating layer 7 including the opening by a sputtering, it is patterned to form the auxiliary magnetic pole piece 9b.

The coil conductor 8 is formed to give a magnetomotive force to the closed magnetic circuit for recording. The coil is formed as it winds round between the thick portion 6 and the recording auxiliary magnetic pole piece 9b. After a conductive material having a low electric resistance such as copper is deposited on the insulating layer 7 by a sputtering, a vapor deposition or an electro-plate, it is patterned to form the coil conductor 8 by applying a photolithography.

The head surface 10 is polished to expose the ends of the main magnetic pole pieces 5a, 5b. The thin film magnetic head of this invention is obtained by the above mention.

In the reproducing head 20a, the closed magnetic circuit is formed by the reproducing main magnetic pole piece 5a, the reproducing auxiliary magnetic pole piece 9a and the high permeability layer of the magnetic recording medium. The magnetic flux from the magnetic recording medium goes through the reproducing main magnetic pole piece 5a efficiently. Part of the magnetic flux flows to the MR element 3 which is disposed in parallel with the reproducing main magnetic pole piece 5a. Because the MR element 3 is disposed near the end of the reproducing main magnetic pole piece 5a, the MR element 3 responds to the magnetic flux of the reproducing signal at a high sensitivity.

Because the distance between the reproducing main magnetic pole piece 5a and the MR element 3 is not smaller than 1 nm, the exchange couple is not produced between the reproducing main magnetic pole piece 5a and the MR element 3. Because the distance between the reproducing main magnetic pole piece 5a and the MR element 3 is not larger than 1 $\mu$m, the magnetostatics effect from the reproducing main magnetic pole piece 5a works on the MR element 3 and the magnetic flux of the reproducing signal flows to the MR element well thereby. It makes the reproduction efficient.

Because the MR element 3 is disposed in parallel with the closed magnetic circuit of the recording head 20b, the magnetic resistance of the close magnetic circuit does not increase and the deterioration of recording efficiency is prevented thereby. Therefore the function of the closed magnetic circuit is enough kept, the magnetic flux of the signal is lead to the recording main magnetic pole piece 5b efficiently.

Further, because the reproducing main magnetic pole piece 5a has a bend at the boundary between the MR element 3 and the main magnetic pole 5, a magnetic pole piece is produced at the bend. It makes the amount of the magnetic flux flown to the MR element 3 increased. It makes the MR element 3 reproduce the signals efficiently thereby.

This head has the construction which the reproducing main magnetic pole piece 5a for the reproducing head 20a and the recording main magnetic pole piece 5b for the recording head 20b are arranged on the same side of the substrate 1. The reproducing main magnetic pole piece 5a is disposed near the recording main magnetic pole piece 5b. It prevents the position reproduced by the reproducing head from slipping off the position recorded by the recording head, when the head is moved by an rotation arm.

Further, because the closed magnetic circuit of the reproducing head 20a does not include a coil, it becomes small and a high sensitivity is obtained for reproducing thereby.

EXAMPLE 2

Figure 3A:
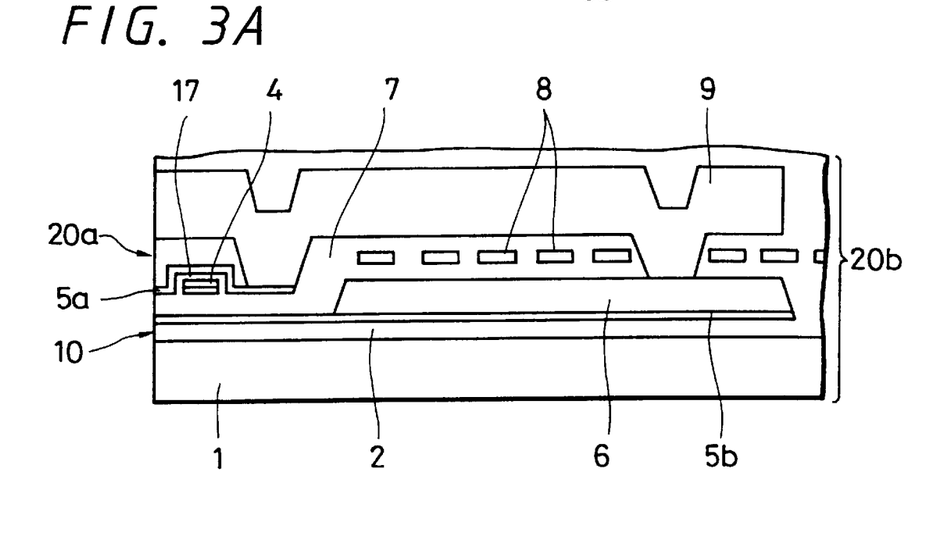
FIGS. 3A and 3B are an enlarged sectional view of the second example of this invention.
Figure 3B:
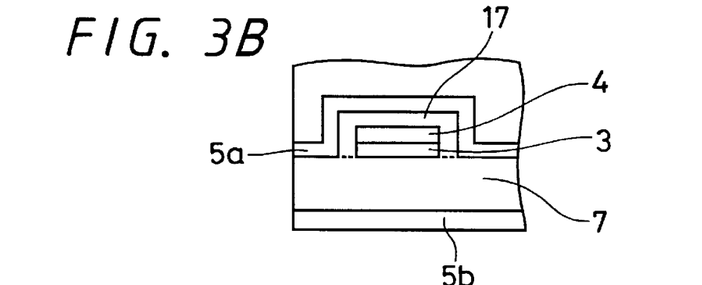

FIG. 3 is an enlarged sectional view showing a second example of this invention. The reproducing head 20a and the recording head 20b is provided separately like as EXAMPLE 1. But the reproducing head 20a and the recording head 20b hold the auxiliary magnetic pole piece 9 (9a and 9b) in common.

The underlayer 2, the recording main magnetic pole piece 5b for the recording head 20b, the thick portion 6 of the recording main magnetic pole piece 5b are formed on the substrate 1. After the MR element portion composed of the MR element 3 and the bias layer 4, the insulating layer 17 and the reproducing main magnetic pole piece 5a are formed by the same materials and the same deposition method as EXAMPLE 1, the coil conductor 8 is formed. The insulating layer 7 is etched to form the contact portions on the reproducing main magnetic pole piece 5a and the thick portion 6. The auxiliary magnetic pole piece 9 is formed to contact the reproducing main magnetic pole piece 5a and the thick portion 6 at the contact portions.

This magnetic head is able to obtain the same high reproduction sensitivity as EXAMPLE 1, while it has a more simple construction than EXAMPLE 1. The reproducing head of this invention does not have an effect on the recording head at recording.

This head also has the construction which the reproducing main magnetic pole piece 5a for the reproducing head 20a and the recording main magnetic pole piece 5b for the recording head 20b are arranged on the same side of the substrate 1. The reproducing main magnetic pole piece 5a is disposed near the recording main magnetic pole piece 5b. Further, because the magnet circuit of the reproducing head 20a does not include a coil, it becomes small and a high sensitivity is obtained for reproducing thereby.

EXAMPLE 3

Figure 2:
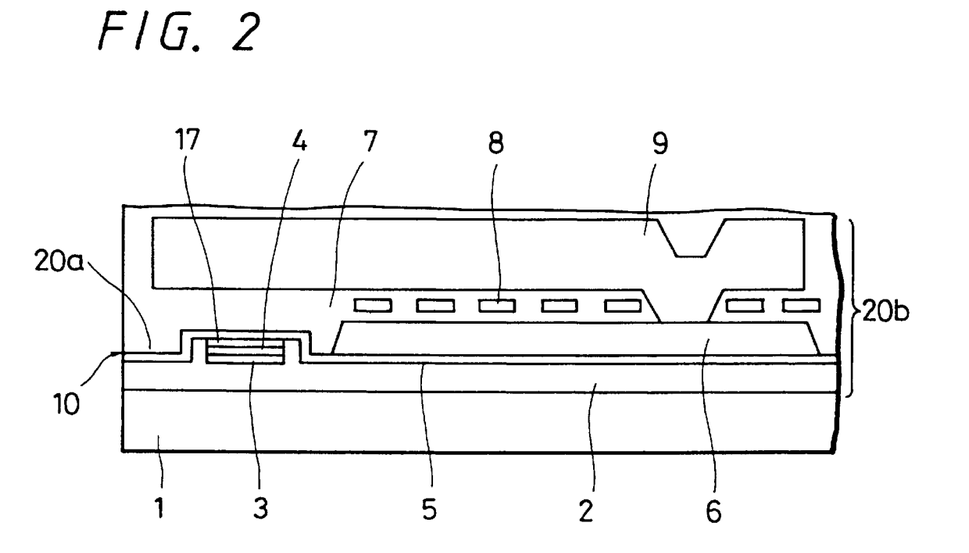
FIG. 2 is an enlarged sectional view of the third example of this invention.

FIG. 2 is an enlarged sectional view showing a third example of this invention. In this example, the reproducing main magnetic pole piece and the recording main magnetic pole piece are unified as the main magnetic pole piece 5. The material of the same part as the part of the above examples is selected like as the above examples.

A MR element 3 and a bias layer 4 are laminated thorough an underlayer 2 on a substrate 1. Part of the main magnetic pole piece 5 is disposed in parallel with the MR element 3 through an insulating layer 17 on the bias layer 4. The distance between the main magnetic pole piece 5 and the MR element 3 is selected from 1 nm to 1 μm by controlling the thickness of the insulating layer 17. The first part of the main magnetic pole piece 5 is almost in the same plane as the MR element 3. The second part of the main magnetic pole piece 5 is almost perpendicular to the MR element 3, but it does not cross the MR element. The third part of the main magnetic pole piece 5 is in parallel with the MR element 3.

This construction of the head is as follows. The MR element and the bias layer 4 are deposited through the underlayer 2 on the substrate 1. The underlayer 2 is overetched, when the MR element 3 and the bias layer 4 are etched to form in a certain pattern. The insulating layer 17 is deposited on the bias layer 4. The thickness of the insulating layer 17 is controlled properly. Further, the main magnetic pole piece 5 is disposed on the whole underlayer 2 including the insulating layer 17.

A thick portion 6 decreasing a magnetic resistance is formed behind the MR element 3 on the main magnetic pole piece 5. A coil conductor 8 is formed through the insulating layer 7 on the thick portion 6. An auxiliary magnetic portion 9 (9a,9b) for recording and reproducing is formed through the insulating layer 7 on the coil conductor 8 like as the above examples. A head surface 10 is polished. The MR element 3 is also disposed between the head surface 10 and the thick portion 6.

EXAMPLE 4

Figure 4:
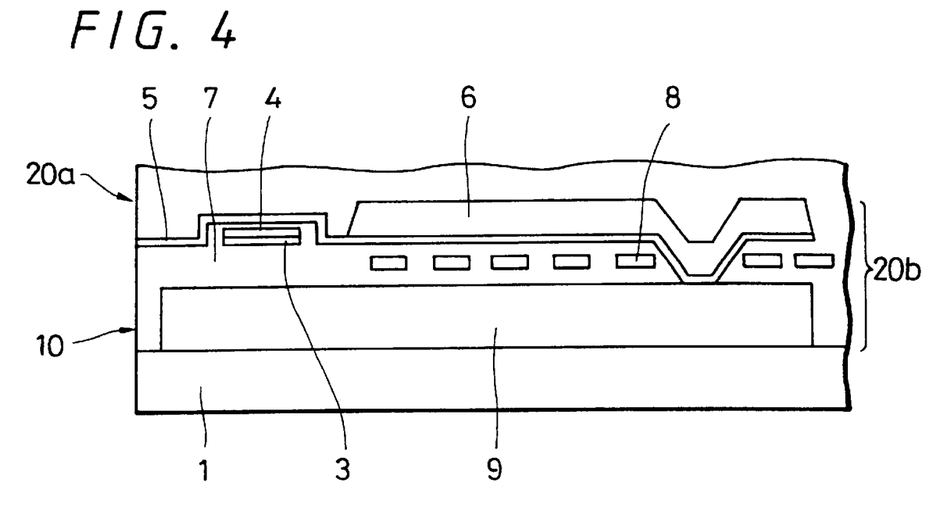
FIG. 4 is an enlarged sectional view of the forth example of this invention.

FIG. 4 is an enlarged sectional view showing a fourth example of this invention. In this example, the main magnetic pole piece 5 for recording and reproducing is unified. The auxiliary magnetic pole piece 9 for recording and reproducing is also unified. The auxiliary magnetic pole piece 9 is disposed on the substrate 1. The MR element 3 and the bias layer 4 are formed through the coil conductor 8 on the auxiliary magnetic pole piece 9. The main magnetic pole piece 5 are formed as it strides over the MR element and the bias layer 4. The thick portion is formed on the main magnetic pole piece 5.

EXAMPLE 5

Figure 5:
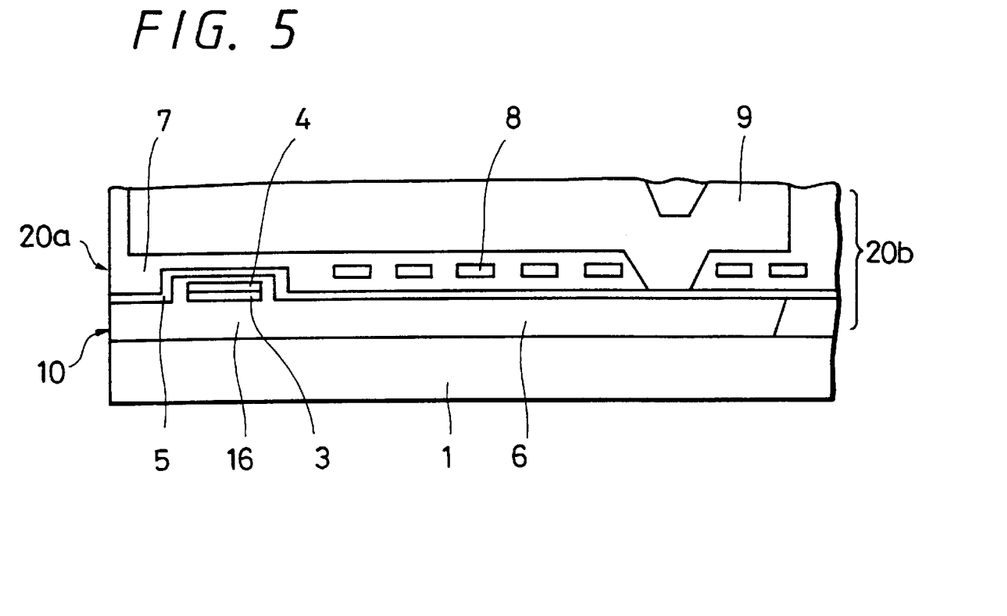
FIG. 5 is an enlarged sectional view of the fifth example of this invention.

FIG. 5 is an enlarged sectional view showing a fifth example of this invention. In this example, the main magnetic pole piece 5 for recording and reproducing is also unified. After the thick portion 6 is patterned to a certain pattern on the substrate 1, a insulating layer 16 is formed. A MR element 3 and a bias layer 4 are formed on the insulating layer 16. A main magnetic pole piece 5 is formed as it strides over the MR element 3 and the bias layer 4. The main magnetic pole piece 5 contacts the thick portion 6. A coil conductor 8 is formed through an insulating layer 7 on the main magnetic pole piece 5. An auxiliary magnetic pole piece 9 for recording and reproducing is formed on the insulating layer 7. The auxiliary magnetic pole piece 9 is used in common for the reproducing head 20a and the recording head 20b.

The magnetic heads of EXAMPLE 3, 4 and 5 can obtain the similar effect to the magnetic heads of EXAMPLE 1 and 2. The reproducing main magnetic pole piece 5, the auxiliary magnetic pole piece 9 and the high permeability layer of the magnetic recording medium form a closed magnetic circuit on the reproducing head 20a. The magnetic flux from the magnetic recording medium goes through the main magnetic pole piece 5 efficiently. Because part of the magnetic flux flows to the MR element 3 disposed near the end of the main magnetic pole piece 5, the MR element 3 responds to the magnetic flux of the reproducing signal at a high sensitivity.

Because the distance between the main magnetic pole piece 5 and the MR element 3 is not smaller than 1 nm, the exchange couple is not produced between the main magnetic pole piece 5 and the MR element 3. Because the distance between the main magnetic pole piece 5 and the MR element 3 is not larger than 1 μm, the magnetostatics is not weaken between the main magnetic pole piece 5 and the MR element 3. Part of the magnetic flux flows from the main magnetic pole piece 5 to the MR element 3 by the magnetostatic effect. The magnetic head reproduces the magnetic recording medium thereby efficiently.

Because the MR element 3 is disposed in parallel with the closed magnetic circuit of the recording head 20b, the magnetic resistance of the closed magnetic circuit does not increase. It prevents the recording efficiency from deteriorating. Therefore the function of the closed magnetic circuit is kept enough. The signal magnetic flux can be led to the main magnetic pole piece 5 efficiently thereby.

Because at least part of the MR element 3, all of the MR element 3 in the above stated examples, is disposed between the head surface 10 and the thick portion 6 of the recording main magnetic pole piece for the recording head, part of the magnetic flux leaked from the main magnetic pole piece 5 is flown to the MR element 3 efficiently. Even though part of the MR element 3 is piled on the thick portion 6 in the direction of the thickness, the similar effect can be obtained by disposing the other part of the MR element 3 between the head surface 10 and the thick portion 6 not to pile on the thick portion 6.

Because the main magnetic pole piece 5 is formed to stride over the MR element 3, a magnetic pole piece is produced at the bend of the main magnetic pole piece 5. The amount of the magnetic flux flown to the MR element 3 is increased thereby. It makes the reproduction more efficient.

Because the main magnetic pole piece 5 is unified, it prevent the position from slipping off at the time of moving the head by the rotation arm, and it prevents cross-talk.

While the invention has been described in conjunction with specific embodiments, it is evident that many alternatives, modifications and variations will become apparent to those skilled in the art in light of the foregoing description. Accordingly, it is intended that the present invention embraces all such alternatives, modifications and variations as falls within the scope of the appended claims.

What is claimed is:

1. A thin film magnetic head comprising:
   a main magnetic pole piece;
   a magnetoresistance effect element;
   a bias layer giving a bias magnetic field to said magnetoresistance effect element;
   an auxiliary magnetic pole piece;
   an insulating layer leaving a space between said main magnetic pole piece and said auxiliary magnetic pole piece; and
   wherein said main magnetic pole piece is almost disposed partly in the same plane with said magnetoresistance effect element; a distance between said main magnetic pole piece and said magnetoresistance effect element is selected from 1 nm to 1 μm and further wherein the main magnetic pole piece is a continuous member with a portion that is substantially parallel to a top surface of the magnetoresistance element that is formed over the entire magnetoresistance effect element and wherein end portions of the main magnetic pole piece are partly disposed in the same plane of the magnetoresistance element.

2. A thin film magnetic head according to claim 1, wherein at least part of said magnetoresistance effect element is piled on said main magnetic pole piece.

3. A thin film magnetic head comprising:
   a recording head including a recording main magnetic pole piece, a recording auxiliary magnetic pole piece, a coil, an insulating layer leaving a space between said recording main magnetic pole piece and said coil, a magnetic gap formed between said recording main magnetic pole piece and said recording auxiliary magnetic pole piece, wherein said magnetic gap, said recording main magnetic pole piece and said recording auxiliary magnetic pole piece forms a closed magnetic circuit; and
   a reproducing head including a reproducing main magnetic pole piece, a magnetoresistance effect element spaced through an insulating layer from said reproducing main magnetic pole piece, a reproducing auxiliary magnetic pole piece, a bias layer giving a bias magnetic field to said magnetoresistance effect element, wherein said reproducing main magnetic pole piece is partly disposed coplanar and in parallel with said magnetoresistance effect element, a distance between said reproducing main magnetic pole piece and said magnetoresistance effect element is selected from 1 nm to 1 μm and further wherein the main magnetic pole piece is a continuous member with a portion that is substantially parallel to a top surface of the magnetoresistance element that is formed over the entire magnetoresistance effect element and wherein end portions of the main magnetic pole piece are partly disposed in the same plane of the magnetoresistance element.

4. A thin film magnetic head according to claim 3, wherein at least part of said magnetoresistance effect element is piled on said reproducing main magnetic pole piece.

5. A thin film magnetic head according to claim 3, wherein said reproducing main magnetic pole piece and said recording main magnetic pole piece are unified.

6. A thin film magnetic head according to claim 3, wherein at least part of said magnetoresistance effect element is disposed between a head surface and a thick portion of said recording main magnetic pole piece.

7. A thin film magnetic head according to claim 5, wherein at least part of said magnetoresistance effect element is disposed between a head surface and a thick portion of said recording main magnetic pole piece.

8. A thin film magnetic head according to claim 5, wherein a first part of said reproducing main magnetic pole piece is almost in parallel with said magnetoresistance effect element, a second part of said reproducing main magnetic pole piece is almost disposed in the same plane as said magnetoresistance effect element, a third part of said reproducing main magnetic pole piece is almost perpendicular to said magnetoresistance effect element and does not cross said magnetoresistance effect element.

9. A thin film magnetic head comprising:
   a main magnetic pole piece;
   a magnetoresistance effect element;
   a bias layer giving a bias magnetic field to said magnetoresistance effect element;
   an auxiliary magnetic pole piece, said main magnetic pole piece being connected to said auxiliary magnetic pole piece to form a continuous path without a gap;
   an insulating layer leaving a space between said main magnetic pole piece and said auxiliary magnetic pole piece; and
   wherein said main magnetic pole piece is partly disposed in the same plane with said magnetoresistance effect element, a distance between said main magnetic pole piece and said magnetoresistance effect element is selected from 1 nm to 1 μm and further wherein the main magnetic pole piece is a continuous member with a portion that is substantially parallel to top surface of the magnetoresistance element that is formed over the entire magnetoresistance effect element and wherein end portions of the main magnetic pole piece are partly disposed in the same plane of the magnetoresistance element.

10. A magnetic head comprising:
    a magneto resistive effect element having a bottom surface and an upper side;
    a bias element, disposed adjacent said upper side of said magneto resistive effect element, for biasing said magneto resistive effect element;
    a magnetic pole piece having a first portion with a bottom surface substantially in a same plane as said bottom surface said magneto resistive effect element;
    said magnetic pole piece having a second portion substantially perpendicular to the first portion, and a third portion lying above and substantially parallel to said upper surface of said magneto resistive effect element, with a gap between said third portion and said upper surface; and
    an insulating layer in said gap between the third portion of the magnetic pole piece and the upper surface of the magneto resistive effect element, said magnetic pole piece being a continuous member and the third portion extending over an entire length of the magneto resistive effect element.

11. The magnetic head of claim 10, wherein the first magnetic pole piece is a reproducing magnetic pole piece.

12. The magnetic head of claim 10, further comprising:
    said magnetic pole piece having a further portion having a bottom surface which is in substantially the same plane as the bottom surface of the first portion of the magnetic pole piece, and an auxiliary magnetic pole piece connected to said further portion.

13. The magnetic head of claim 12, wherein the auxiliary magnetic pole piece has an end which extends below the first portion of the magnetic pole piece.

14. The magnetic head of claim 10, wherein said magnetic pole piece is a first magnetic pole piece and further comprising a second magnetic pole piece formed above the first magnetic pole piece, said second magnetic pole piece being substantially parallel to the first portion of the first magnetic pole piece.

15. The magnetic head of claim 14, wherein the second magnetic pole piece is a recording magnetic pole piece.

16. The magnetic head of claim 14, further comprising a second auxiliary magnetic pole piece connected to the second magnetic pole piece.

* * * * *